United States Patent [19]
Humphrey

[11] 3,761,158
[45] Sept. 25, 1973

[54] TELESCOPE HAVING IMMERSED MIRROR STABILIZER
[75] Inventor: William E. Humphrey, Berkeley, Calif.
[73] Assignee: Optical Research and Development Corporation, Oakland, Calif.
[22] Filed: June 16, 1972
[21] Appl. No.: 263,576

[52] U.S. Cl............................ 350/16, 350/34, 350/55
[51] Int. Cl. ............................................ G02b 23/02
[58] Field of Search................................. 350/16, 55

[56] References Cited
UNITED STATES PATENTS
3,532,409  10/1970  Humphrey........................... 350/16

Primary Examiner—David H. Rubin
Attorney—Stephen S. Townsend et al.

[57] ABSTRACT

An immersed mirror stabilizer adapted for use in a catadioptric optic train. A cell having transparent end walls and containing transparent fluid is provided. A mirror is gimbal mounted and buoyantly neutrally supported within the cell. The mirror has an outer reflecting surface and a central hole for transmitting therethrough retrodirected light to a downstream imaging plane. According to the preferred embodiment, incident light is transmitted from an objective lens, through one transparent wall of the cell, to the stabilized mirror. The mirror retrodirects the light through the same transparent wall to a secondary mirror, typically located at the objective. Once again, the light is retrodirected from the secondary mirror, through the transparent wall, the hole in the mirror, and out the second transparent wall for imaging at downstream optics, typically a film plane.

19 Claims, 6 Drawing Figures

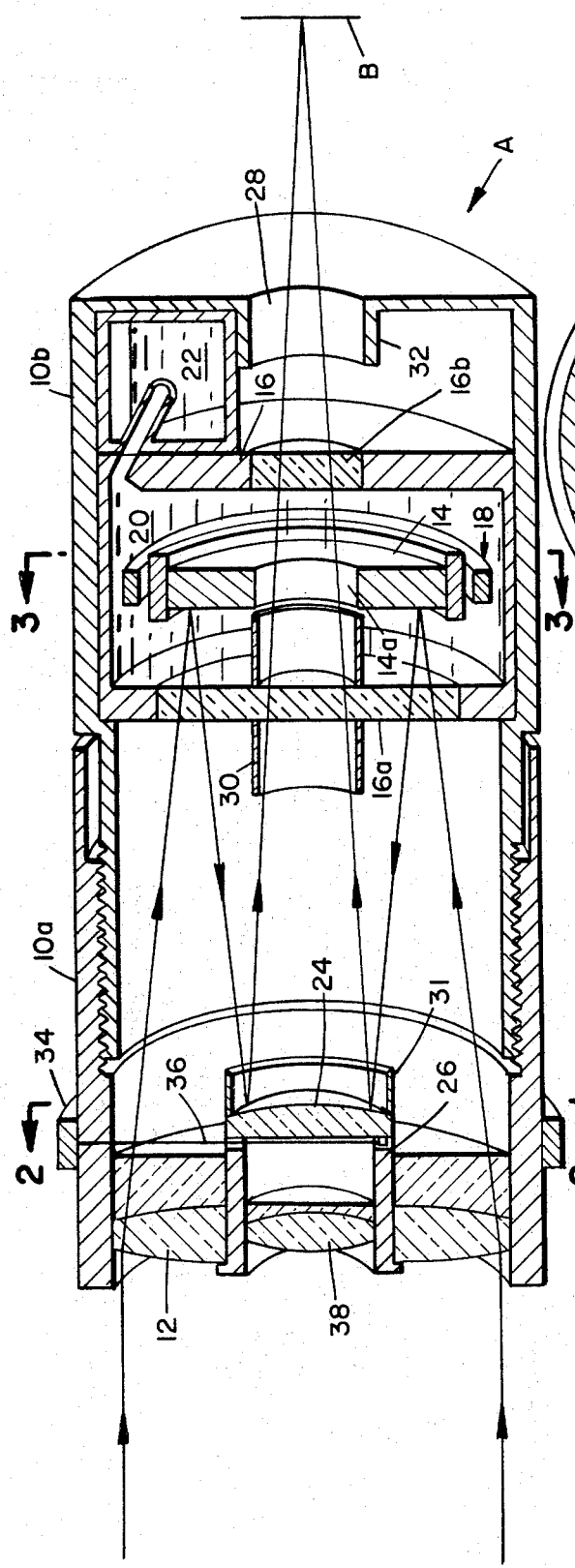
FIG_1
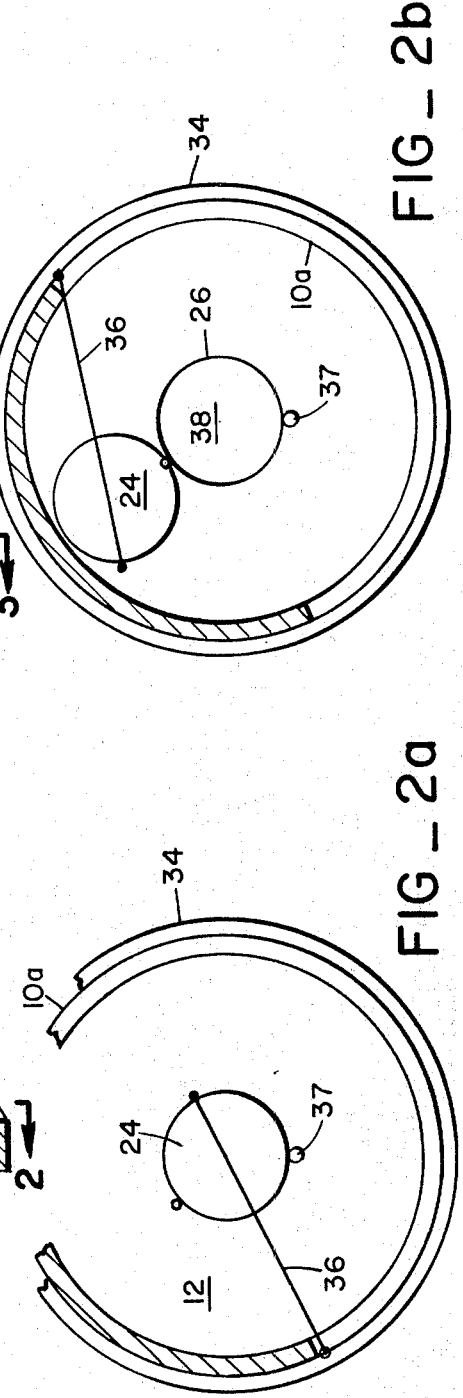
FIG_2a
FIG_2b

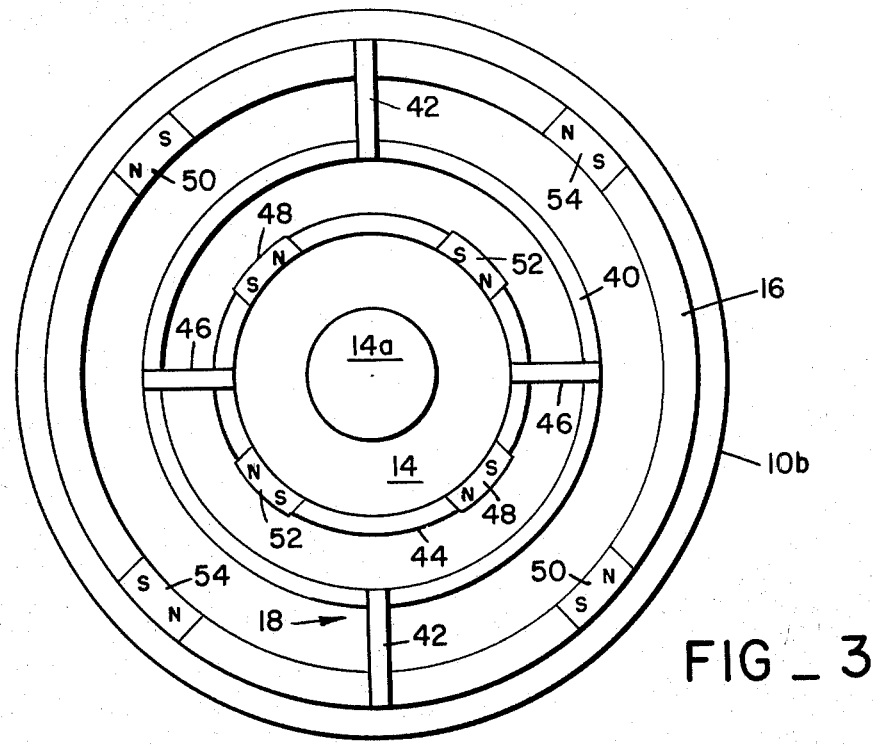
FIG_3
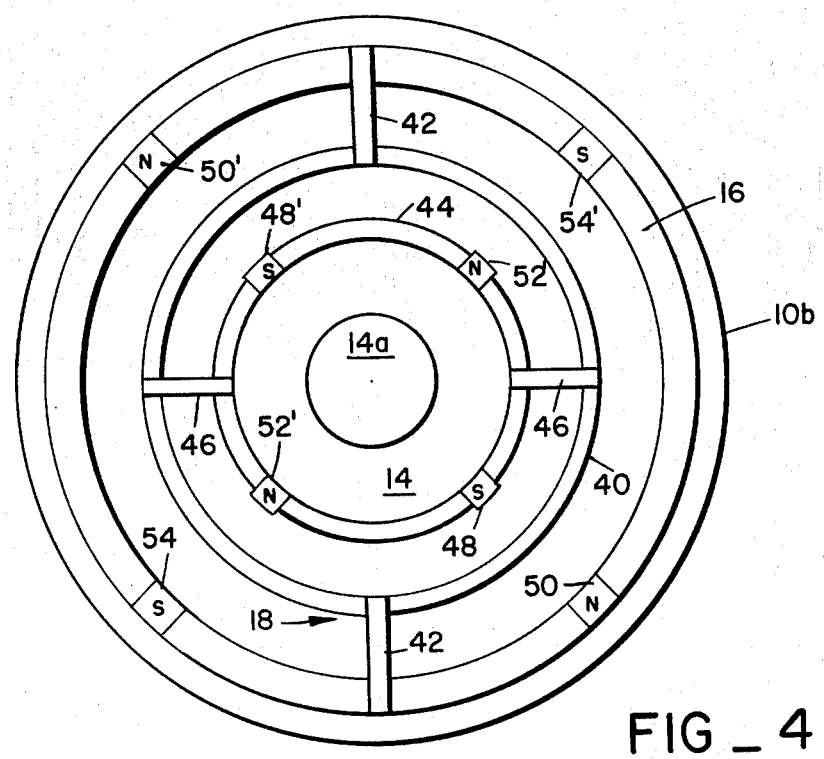
FIG_4

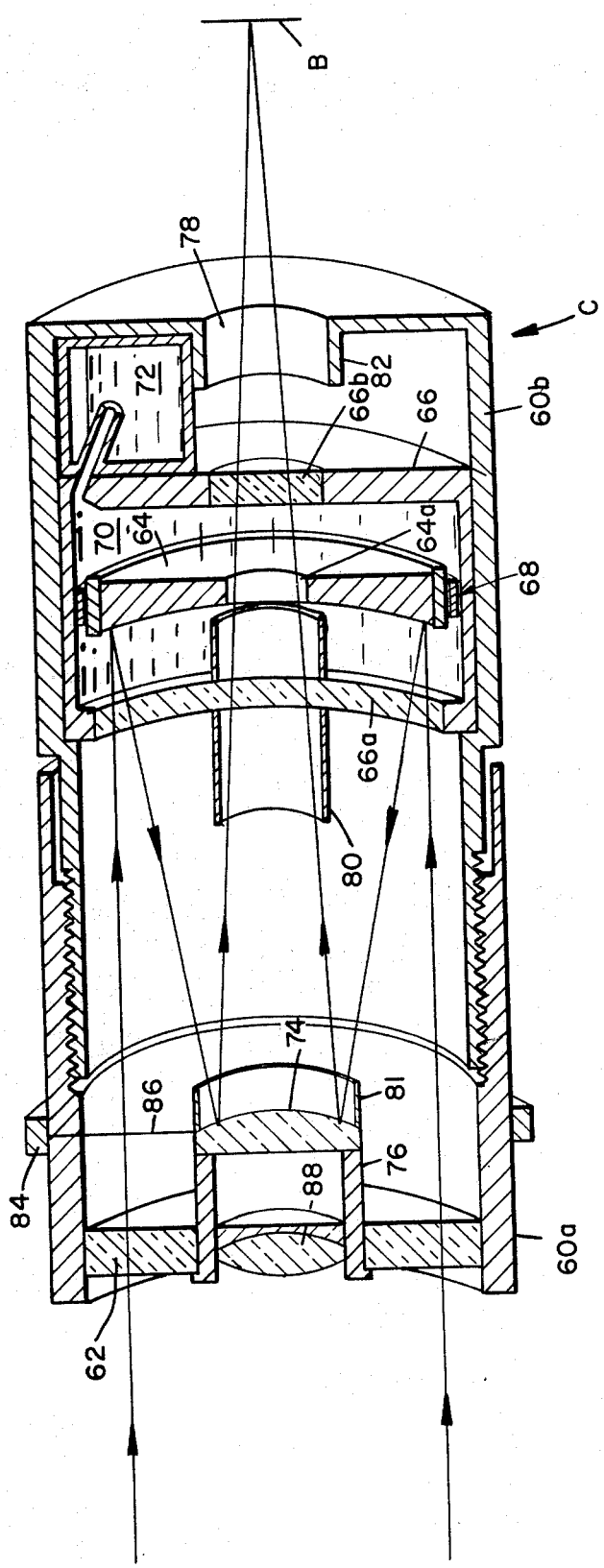
FIG_5

TELESCOPE HAVING IMMERSED MIRROR STABILIZER

This invention relates to optical stabilizers and, more particularly, to an immersed mirror stabilizer employed in a cassegrainian optical train.

In my copending patent application entitled "Mirror Stabilizer Having Space Referenced Motion", Ser. No. 75,965, filed Sept. 28, 1970, now U.S. Pat. No. 3,711,178, issued Jan. 16, 1973, I have disclosed an immersed stabilized mirror which may be employed in retrodirected light paths. According to the disclosure of my earlier patent application, however, it was not possible to merely retrodirect the light. Rather, the light had to be periscoped away from the region between the objective and mirror.

Such periscoping has numerous disadvantages. Periscoping significantly increases the bulk of the optical instrument. In addition, a periscoped optical train is generally unacceptable for conventional camera-mounted optics. Specifically, the increased bulk of the lens system makes the camera and attached stabilized lens system unwieldy, as well as less attractive in appearance.

According to the present invention, an immersed mirror stabilizer adapted for use in a catadioptric optic train is provided. A mirror is gimbal mounted and buoyantly neutrally supported in a cell having transparent end walls and containing transparent fluid. The mirror has an outer reflecting surface and a central hole or aperture for transmitting therethrough retrodirected light to a downstream imaging plane. According to the preferred embodiment, there is provided a catadioptric optical train in which incident light is transmitted from an objective lens, through one transparent wall of the cell, to the stabilized mirror. The mirror retrodirects the light through the same transparent wall to a secondary mirror, typically located at the objective. Once again, the light is retrodirected from the secondary mirror, through the transparent wall, the hole in the mirror, and out the second transparent wall for imaging at downstream optics, typically a film plane. According to another embodiment, the objective lens is omitted and a dish-type stabilized mirror is employed, so that convergence of the light path is provided by the mirror.

Accordingly, it is an object of the present invention to provide a stabilized immersed mirror for use in a catadioptric light path.

Another object of the present invention is to provide a stabilized catadioptric telescope system.

A further object of the present invention is to provide a catadioptric system employing an immersed stabilized mirror.

Still another object of the present invention is to provide a catadioptric optical system employing a dished stabilized mirror to converge the light path.

The catadioptric stabilized optical system according to the present invention is advantageous in that it can be used in a concentric housing readily mountable to a conventional camera. Moreover, the requirement of periscoping the retrodirected light from the interval between the objective and mirror, in accordance with my previous application, is eliminated. Thus, the bulk and complexity of the stabilized optic system according to the present invention is minimized. Further, the central obscuration in the optic path can be used to advantage to reduce the importance of stray reflections from the stabilizer cell windows.

These and other objects, features and advantages will be more readily apparent from the following detailed description, wherein reference is made to the accompanying drawings in which:

FIG. 1 is a side elevation section, in perspective, of a stabilized catadioptric cassegrainian optical system according to a preferred embodiment of the present invention;

FIGS. 2a and 2b are sectional views, taken along the line 2—2 in FIG. 1, illustrating the secondary mirror in operating and retracted positions, respectively;

FIG. 3 is a sectional view, taken along the line 3—3 in FIG. 1, illustrating the gimbal system mounting the stabilized mirror;

FIG. 4 is a sectional view, similar to FIG. 3, illustrating an alternative gimbal arrangement; and FIG. 5 is a side elevation section, in perspective, similar to FIG. 1, of an alternative embodiment of a cassegrainian optical system according to the present invention employing a dished mirror for light convergence.

Referring initially to FIG. 1, there is depicted a stabilized catadioptric cassegrainian optical system A according to the present invention, adapted to image areas in space in the field of view on an imaging or film plane B. The optical system A generally comprises a cylindrical housing having a front portion 10a threadably engaging a rear portion 10b. As will be more readily apparent hereinafter, rotation of front housing portion 10a with respect to rear housing portion 10b will vary the length of the light path, and is thus employed to focus the optical system A.

An objective lens 12 is mounted in front housing portion 10a. Light incident upon objective lens 12 is converged onto a stabilized planar mirror 14 disposed in a cell or housing 16 in rear housing portion 10b. Specifically, mirror 14 is mounted in cell 16 by a gimbal assembly 18. Cell 16 includes a transparent front wall 16a adapted to permit the passage of the light therethrough onto mirror 14. Cell 16 contains a transparent fluid 20 which preferably buoyantly neutrally supports mirror 14. It should be noted that total neutral buoyant support is not required.

Gimbal assembly 18 includes means for biasing the mirror 14 to a neutral position, as will be described in greater detail hereinafter. Gimbal assembly 18 and transparent fluid 20 cooperate to stabilize mirror 14 within cell 16, as will be described in greater detail hereinafter in accordance with my earlier recited copending patent application. A bubble trap 22 is provided in rear housing portion 10b in fluid communication with the interior of cell 16. Bubble trap 22 functions to capture any bubbles present in the transparent fluid 20.

The light incident upon mirror 14 is reflected and thus retrodirected through transparent window or portion 16a of cell 16 to a secondary mirror 24. Specifically, secondary mirror 24 is disposed on a collar 26 carried by objective lens 12, substantially normal to the axis of the optical train. Thus, mirror 24 functions to reflect and thereby once again retrodirect the light incident thereon.

The light retrodirected by mirror 24 passes, once again, through transparent window 16a of cell 16, and thence passes through a central transparency or aperture 14a provided in stabilized mirror 14. The light continues through the transparent fluid 20 in cell 16 and exits cell 16 through a transparent portion or rear window 16b provided in the rear wall of the cell 16. After exiting cell 16, the light continues along its path and exits rear housing portion 10b through a hole or aperture 28 provided in the rear wall thereof. The light thus exits the optical system according to the present invention and is focused upon image or film plane B, as illustrated in FIG. 1.

At this point, some important observations may be made concerning the path of the light in accordance with the optical system A according to the present invention. First, the path of the light through the optical system A includes two retrodirections, by mirror 14 and 24, respectively. Furthermore, the light path proceeds through aperture 14a in the center of mirror 14, to exit the optical system. Thus, the optical system according to the present invention is of the catadioptric variety wherein twice retrodirected light passes through a central aperture in the mirror.

As briefly referred to hereinbefore, mirror 14 is stabilized within cell 16 by the cooperation of fluid 20 and gimbal assembly 18. Specifically, as will be described in greater detail hereinafter, gimbal assembly 18 may function to bias mirror 14 to a neutral position normal to the axis of the optical system A in addition to its principal function of localizing mirror 14 at a desired position in chamber 16. Motion of the system will cause hydrostatic pressure to be coupled through fluid 20 to mirror 14, to overcome the biasing between housing 10b and mirror 14. As described in my earlier recited copending patent application, an angular deflection of cell 16 of an angle $\phi$ will cause mirror 14, to assume an angular orientation $\theta$ with respect to cell 16. This angular orientation $\theta$ will result in the angle between the incident ray and the reflected ray being altered by an amount of $2n\theta$ from the case where the mirror would be rigidly attached to the cell, where n is the index of refraction of the fluid 20 in the cell.

If the mirror 14 had moved with the cell 16, an image shift at the focus of objective lens 12 would have occurred equal to $\phi \times F_1$, where $F_1$ is the focal length of objective lens 12. However, mirror movement and fluid index of refraction n have diminished this shift by $2n\phi \times D_1$, where $D_1$ is approximately the optical distance from mirror 14 to the focal plane of objective lens 12. Hence, the image shift is effectively cancelled provided $2n\theta \times D_1 - \phi \times F_1 = 0$.

Having set forth the relationship between the incident and reflected rays on the mirror 14, the relationship of the remainder of the optics of this invention can be easily understood. Typically, the mirror 14 is disposed in the optical system A of this invention to satisfy the equation:

$$2n\theta \times D_1 = \phi \times F_1$$

where $D_1$ is the distance between the mirror 14 and the focal point of the objective lens 12, and $F_1$ is the focal length of the objective lens 12.

It is apparent that the above equation may be solved by insertion of the appropriate values for a particular optical system A to produce a stabilized optical system A.

Moreover, since mirror 14 is thus immersion stabilized, it is apparent that the optical system A according to the present invention provides a stabilized cassegrainian optical train, wherein accidental motion or vibration of the optical train will not effect the stability of the image. Such a construction is thus particularly advantageous for hand-held optical systems, as for example, high powered telephoto camera lens systems or hand-held viewing devices which heretofore have been plagued by image instability problems due to accidental motion or vibration.

It should be appreciated that the equation set forth is for camera stabilization. It should be understood, to anyone having ordinary skill in the art that with the modification of;

$$2n\theta \times D_1 = [\phi \times F_1][1 \pm 1/M]$$

to the above equation, eye stabilization can be achieved. In the above equation M is the overall magnification of the optic train. Such a modification is disclosed in U.S. Pat. No. 3,473,861 issued 21 Oct. 1969, entitled "Accidental-Motion Compensation for Optical Devices."

In addition, in the particular preferred embodiment of the present invention depicted in FIG. 1, reflecting cassegrainian optics are employed in combination with a refractive objective lens 12, objective lens 12 functioning to converge the light path. Thus, the preferred embodiment of the present invention in FIG. 1 is of the catadioptric variety.

The optical system A according to the present invention also includes a baffle arrangement adapted to minimize stray reflections interior of the optical train. Specifically, a cylindrical baffle 30 is mounted to transparent wall 16a, on both sides thereof. Baffle 30 is disposed coaxially with respect to the axis of the optic train, and has a diameter adapted to minimize interference with the light path through the optical train, as previously described. Specifically, it is apparent that the area of transparent window 16a remote from the axis of the optical train functions to transmit light to and from mirror 14. The region of transparent window 16a adjacent the optical axis functions to transmit the light from mirror 24, through cell 16, to exit the optical system A. Thus, baffle 30 possesses a diameter intermediate these two regions, so that baffle 30 will not appreciably interfere with the light path thus described. However, baffle 30 will function to obstruct stray reflected light traveling on paths other than the desire optical path previously described. Baffle 31 surrounding mirror 24 serves in a similar manner to obstruct stray light.

A third cylindrical baffle 32 is disposed about aperture 28, interior of rear housing portion 10b. Baffle 32 has a diameter slightly greater than the width of the light path in this region, and thus, once again, will not interfere with light traveling along the desired optical path previously described. However, stray reflected light traveling in this region along other paths will impinge upon baffle 32 and will thus be obstructed. Accordingly, baffles 30, 31 and 32 cooperate to minimize stray reflections interior of the optical train, and thereby function to maximize the image quality of the optical system A according to the present invention. In addition, it is found that removing or blackening the reflective coating over a central disk of mirror 24 further reduces the reflection of stray light onto the desired image plane B, without appreciably degrading the intended imaging properties of the optical system.

Referring now to FIGS. 1, 2a and 2b, the viewfinder system of the optical system A according to the present invention will now be described in detail. Specifically, according to the preferred embodiment of the present invention, a non-stabilized viewfinder system is provided, to facilitate alignment and aiming of the optical system A.

To this end, secondary mirror 24 is pivotally mounted to collar 26. Specifically, a rotatable collar 34 is provided about front housing portion 10a. Rotatable collar 34 is linked to secondary mirror 24 by wire 36 here illustrated as a thin rigid member. As illustrated in FIG. 2b, rotation of collar 34 with respect to front housing portion 10a will cause wire 36 to act on mirror 24, and thus rotate it away from the optical axis. Conversely, rotation of collar 34 to its initial position will return mirror 24 to its initial desired position coaxial with the optical axis. Moreover, it is apparent that when mirror 24 is in its initial position coaxial with the optical axis, wire 36 is displaced slightly past center, to detent or latch mirror 24 in this position against a locating stop 37. Thus, mirror 24, although pivotally mounted, will be accurately positioned.

When mirror 24 is pivoted away from the optical axis, as illustrated in FIG. 2b, a viewfinder objective lens 38, carried within collar 26, is revealed along the optical axis. Since mirror 24 is no longer aligned with the cassegrainian light path previously described, the cassegrainian light path will cease to operate. An alternative light path through viewfinder objective lens 38 along the optical axis will then be created. In this manner, the stabilized reflective light path may be interrupted and a simple unstabilized viewfinder light path created. This viewfinder light path is conveniently employed to orient or aim the optical system A.

It is noteworthy thst the light path of the viewfinder system is substantially shorter than the previously described reflective light path of the stabilized catadioptric system according to the present invention. Accordingly, viewfinder objective lens 38 preferably possesses a focal length substantially shorter than the effective focal length of the objective lens 12, acting with mirror 24, so that the viewfinder optical system will maintain substantial focus with the stabilized cassegrainian optical system.

Referring now to FIG. 3, the gimbal mounting system 18 for stabilized mirror 14 will now be described in detail. A gimbal ring 40 is pivotally mounted to cell 16 for rotational movement about a vertical axis by a pair of vertically disposed pivot pins 42. Inner mirror assembly 44 is carried by gimbal ring 4. Specifically, inner mirror assembly 44 is mounted to gimbal ring 40 for rotational movement about a horizontal axis by a pair of horixontally disposed pivot pins 46. Mirror 14 is mounted in inner mirror assembly 44 and is thus free to rotate in two dimensions. Specifically, mirror 14 may rotate about a horizontal axis via the rotation of inner mirror assembly 44 on pins 46. Similarly, mirror 14 may rotate about a vertical axis via the rotation of gimbal ring 40 on pins 42.

According to the immersion stabilization technique of the present invention, as described hereinbefore, it is necessary to bias mirror 14 to a neutral position. In accordance with the preferred embodiment of the present invention depicted in FIG. 3, such biasing is accomplished by a plurality of magnets. Specifically, a pair of magnets 48 are carried on inner mirror assembly 44 at opposite sides of mirror 14. A complementary pair of magnets 50 are mounted on cell 16 at corresponding locations. The north and south poles of the magnets 48 and 50 are suitably disposed, as depicted in FIG. 3, to create attractive magnetic force between the corresponding magnets 48 and 50. Such attractive force tends to bias mirror 14 to an aligned or neutral position.

Additional biasing of mirror 14 is accomplished in a substantially identical manner. Specifically, a pair of magnets 52 are mounted on inner mirror assembly 44 intermediate of magnet pair 48 and at opposite sides, respectively. Similarly, a complementary pair of magnets 54 are mounted on cell 16 at corresponding locations. The magnetic poles of magnets 52 and 54 are aligned to create attractive magnetic force between corresponding magnets 52 and 54, and to thereby bias or urge mirror 14 to an aligned or neutral position.

It is thus apparent that the magnets 48, 50, 52 and 54 cooperate to bias the mirror 14 to a neutral position substantially normal to the axis of the optical system A. Of course, accidental motion or vibration of the optical system A will cause hydrostatic pressures to be coupled through fluid 20 to the mirror 14, which will overcome the netural biasing, and function to stabilize mirror 14 as described in greater detail hereinbefore.

Referring now to FIG. 4, an alternative magnetic biasing system will now be described. Specifically, the gimbal arrangement depicted in FIG. 4 is identical to that previously described. Thus, a gimbal ring 40 is mounted for rotational movement about vertical pins 42. Similarly, an inner mirror assembly 44 carrying mirror 14 is mounted for rotational movement about horizontal pins 46.

According to this embodiment, magnets are once again employed to bias the mirror 14. However, unlike the previous embodiment, the magnets are disposed parallel to the axis of the optical system A. Thus, a pair of magnets 48' are carried on inner mirror assembly 44 at opposite sides of mirror 14, the magnets being aligned with the optical axis. A complementary pair of magnets 50' are mounted on cell 16 at corresponding locations. The north and south poles of the magnets 48' and 50' are suitably disposed, as depicted in FIG. 4, to create attractive magnetic force between the corresponding magnets 48' and 50'. Such attractive force tends to bias mirror 14 to an aligned position. Further biasing is accomplished in a substantially identical manner by two pairs of magnets 52' and 54'.

The outer magnets 50, 54 or 50', 54' of these two above described configurations may be internal of the chamber 16, or external to facilitate final trimming of mirror alignment.

It is noteworth that the north and south poles of the magnets alternate about the circumference of the mirror 14 and cell 16 in both the described configurations. Applicant has found that such alternation of magnets of substantially equal power tends to minimize the effects of ambient magnetic fields on the magnetic biasing system for the configurations of both FIGS. 3 and 4.

Of course, means other than magnets may be provided for biasing the mirror 14 to its neutral position. For example, elastic cords, as described in my earlier copending patent application, may be employed to serve both as gimbal bearing and biasing means.

Referring now to FIG. 5, an alternative embodiment of the present invention will now be described in detail. While the previously described embodiment employed an objective lens to converge the light beam, the present embodiment does not employ an objective lens, but instead employs a dished mirror to obtain light convergence. In other respects, this embodiment is generally similar to the embodiment previously described.

Specifically, there is depicted in FIG. 4 an immersed stabilized cassegrainian optical system C adapted to form an image on an image or film plane B. Optical system C generally comprises a housing having a front portion 60a threadably engaging a rear portion 60b. As will be more readily apparent hereinafter, rotation of front housing portion 60a with respect to rear housing portion 60b varies the length of the light path, and is thus employed to focus the optical system.

As briefly referred to hereinbefore, the present embodiment does not employ an objective lens. Instead, a transparent disk or correcting lens 62 is mounted in front housing portion 60a. Disk 62 may have some optical effect, and in addition provides a seal for the front opening of housing 60a, and a mount for other elements, as will be described in greater detail hereinafter.

Light incident upon disk 62 proceeds onto a stabilized dished mirror 64 disposed in a cell or housing 66 in rear housing portion 60b. Specifically, mirror 64 is mounted in cell 66 by a gimbal assembly 68, substantially identical to gimbal assembly 18 previously described. Cell 66 includes a transparent front wall 66a adapted to permit the passage of the light therethrough onto mirror 64. Cell 16 contains a transparent fluid 70 which buoyantly neutrally supports mirror 64. As described with respect to the previous embodiment, gimbal assembly 68 and/or housing 60b includes means for biasing the mirror 64 to a neutral position. Moreover, gimbal assembly 68 and transparent fluid 70 cooperate to act on and stabilize mirror 64 within cell 66, as described in greater detail in my earlier recited copending patent application. A bubble trap 72 is provided in rear housing portion 60b in fluid communication with the interior of cell 66.

Mirror 64 has a dished front surface, as illustrated in FIG. 4. Thus, light incident upon mirror 64 is reflected along a convergent path and thus retrodirected through transparent window 66a of cell 66 to a secondary mirror 74. Window 66a will generally be curved to facilitate optical correction and may have some lens power. Specifically, secondary mirror 74 is disposed on a collar 76 carried by disk 62. Mirror 74 is substantially normal to the axis of the optical train and thus functions to reflect and thereby once again retrodirect the light incident thereon. The light retrodirected by mirror 74 passes, once again, through transparent window or another window inserted centrally in window 66a of cell 66, and thence passes through a central transparency or aperture 64a provided in stabilized mirror 64. The light continues through the transparent fluid 70 in cell 66 and exits cell 66 through a transparent rear window 66b provided in the rear wall of the cell 66. After exiting cell 66, the light continues along its path and exits rear housing portion 60b through a hole or aperture 78 provided in the rear wall thereof. The light thus exits the optical system according to the present invention and is focused upon image or film plane B, as illustrated in FIG. 4.

The optical system C according to the present embodiment includes cylindrical baffles 80, 81 and 82 thus function to obstruct stray reflections interior of the optical train and thereby maximize the image quality.

Secondary mirror 74 is pivotally mounted, as described with respect to secondary mirror 24 of the previous embodiment. Specifically, a rotatable collar 84 is provided about front housing portion 60a and is linked to secondary mirror 74 by an elongate wire 86. Rotation of collar 84 will thus pivot secondary mirror 74 away from the optical axis to reveal a viewfinder objective lens 88. As described with respect to the previous embodiment, a viewfinder optical path is thus formed substantially along the optical axis. Since the viewfinder optical path length is substantially shorter than the effective stabilized reflective light path focal length, viewfinder objective lens 88 preferably possesses a focal length substantially shorter than the focal length of dished mirror 64 and mirror 74 acting in concert, so that the focus of the optical viewfinder system will generally correspond to the focus of the reflective light path.

It should be understood that mirror 24 could be made to pivot without simultaneous pivoting of baffle 31. This would enable view finding without the interference of light passing through objective lens 12.

Once again, it is apparent that optical system C forms a cassegrainian type optical system, wherein light is twice retrodirected, passing through a central aperture 64a in the mirror 64. However, no substantial objective lens power need be employed, the light convergence being provided by the dished mirror 64.

Accordingly, it is apparent that the stabilized catadioptric optical system according to the present invention may be embodied in a variety of systems of which the optical system A of FIG. 1 and the optical system C of FIG. 5 are representative. The catadioptric optical system according to the present invention are stabilized by the immersed mirror with respect to accidental motion or vibration, and are thus preferably employed in hand-held optical system such as camera lenses or stabilized viewing devices.

It should be understood that emphasis has been given to camera applications. This invention can be adapted to telescopes, especially of the Gregorian variety. Moreover, a real image could be formed in the telescope (as in the case of the Gregorian telescope), or on the retina of the human eye.

Moreover, transparent portions 16a and 16b of the cell have here been shown as planar. As should be apparent, solid or fluid lenses could be added to the cell at this location. Moreover, one part of transparent portion 16a of the cell could comprise a lens, and the remaining part of the transparent portion a window.

While particular embodiments of the present invention have been shown and described in detail, it is apparent that adaptations and modifications will occur to those skilled in the art. Such adaptations and modifications are specifically within the spirit and scope of the present invention.

What is claimed is:

1. An optical stabilizer for use in combination with a catadioptric optical train wherein received light is directed onto a first mirror, reflected to a second mirror and retrodirected through an aperture centrally located in said first mirror comprising: a chamber having first and second transparent portions forming first and second walls thereof; a first mirror pivotally mounted within said chamber, said first mirror having a reflective surface and defining transparency; means for biasing said first mirror to a preselected neutral position in said chamber for receiving incident light through said first portion to said outer mirror portion, said first mirror reflecting said light through said first portion; said transparency in said first mirror and said first and second transparent portions being aligned to receive retrodirected light from said second mirror to pass through said chamber; a substantially transparent fluid interior of said chamber and surrounding said mirror; and means for coupling said mirror and said chamber through said fluid for overcoming said biasing means and moving said mirror relative said chamber at a preselected rate when said chamber undergoes angular motion.

2. Apparatus according to claim 1 wherein said fluid buoyantly neutrally supports said first mirror in said chamber.

3. Apparatus according to claim 1 wherein said transparency of said first mirror comprises a centrally located aperture in said first mirror.

4. Apparatus according to claim 1 wherein said biasing means comprises a first plurality of magnets disposed about the perimeter of said mirror, a second plurality of magnets disposed about said chamber, the poles of said magnets being aligned to produce attractive magnetic force biasing said mirror to a neutral position.

5. Apparatus according to claim 4 wherein said first and second plurality of magnets are aligned axially with respect to said mirror.

6. Apparatus according to claim 1 wherein said chamber is cylindrical and wherein said coupling means includes the inside walls of said chamber and the surface of said mirror.

7. A catadioptric optical system stabilized for angular vibrational orientation comprising a housing having first and second openings, said first opening disposed for receiving incident light to an imaging surface; a chamber disposed in said housing having first and second transparent portions forming the walls thereof; a first mirror pivotally mounted within said chamber, said first mirror having reflective surface and defining a transparency; means for biasing said first mirror to a preselected neutral position in said chamber for receiving incident light from said first opening through said first portion and reflecting said light through said first portion; a second mirror mounted in said housing to retrodirect light reflected from said first mirror through said first transparent portion and transparency of said first mirror and said second transparent portion and said second opening to said imaging plane; a substantially transparent fluid interior of said chamber and surrounding said first mirror; and means for coupling said first mirror and said chamber through said fluid for overcoming said biasing means and moving said mirror relative said chamber at a preselected rate when said housing undergoes vibrational angular motion.

8. Apparatus according to claim 7 wherein said fluid buoyantly neutrally supports said first mirror in said chamber.

9. Apparatus according to claim 7 wherein said transparency of said first mirror comprises a central aperture in said first mirror.

10. Apparatus according to claim 7 wherein said first mirror is provided with a curved reflecting surface.

11. Apparatus according to claim 7 wherein said first mirror is planar and further comprising an objective lens disposed in said housing for converging said incident light from said opening onto said first mirror.

12. Apparatus according to claim 7 wherein said second mirror is pivotally mounted and further comprising a viewfinder objective lens disposed adjacent said second mirror, said viewfinder objective lens being revealed on pivotal movement of second mirror.

13. Apparatus according to claim 12 comprising a collar rotatably disposed about said housing and a thin elongate member connecting said collar and said second mirror for rotational movement.

14. Apparatus according to claim 7 wherein said biasing means comprises a first plurality of magnets disposed about the perimeter of said mirror, a second plurality of magnets disposed about said chamber, the poles of said magnets being aligned to produce attractive magnetic force biasing said mirror to a neutral position.

15. Apparatus according to claim 14 wherein said first and second plurality of magnets are aligned axially with respect to said mirror.

16. A catadioptric optical system stabilized for angular vibrational orientation comprising a housing having a first and second opposed openings, said first opening disposed for receiving incident light and said second opening disposed to transmit processed light to an imaging plane; an objective lens disposed in said first opening; a chamber disposed in said housing having first and second transparent portions forming walls thereof; a first mirror pivotally mounted in said chamber, said first mirror having a planar outer reflective surface and defining a transparency, said objective lens converging incident light upon the outer reflective surface of said first mirror through said first transparent portion; a second mirror retrodirecting the light reflected by said first mirror through said first transparent portion and the transparency in said first mirror and said second transparent portion and said second opening to said imaging plane; a substantially transparent fluid interior of said chamber and surrounding said mirror, means biasing said mirror to a preselected neutral position in said chamber; and means for coupling said first mirror in said chamber through said fluid for overcoming said biasing means and moving said first mirror relative said chamber at a preselected rate when said housing undergoes angular motion.

17. Apparatus according to claim 1 wherein said mirror is provided with a curved reflecting surface.

18. Apparatus according to claim 1 and wherein said first and second transparent portions are flat.

19. A reflective optical system stabilized for angular vibrational orientation comprising a housing having first and second opposed openings, said first opening disposed for receiving incident light and said second opening disposed to transmit processed light to an imaging plane; a chamber disposed in said housing having first and second transparent portions forming walls thereof; a dished mirror having an outer reflective surface and a defining transparency mounted for pivotal movement in said chamber; a substantially transparent fluid interior of said chamber and surrounding said dished mirror; means for biasing said dished mirror to a preselected neutral position in said chamber for receiving incident light through said first opening and said first transparent portion and convergently reflecting said incident light through said first transparent portion; a second mirror disposed in said housing to retrodirect reflected light from said dished mirror through said first transparent portion and the transparency defined in said dished mirror and said second transparent portion and said second opening to said impaging plane; means coupling said disher mirror and said chamber through said fluid for overcoming said biasing means and moving said dished mirror relative said chamber at a preselected rate when said chamber undergoes angular motion.

* * * * *